(12) United States Patent
Brehm

(10) Patent No.: US 6,763,931 B1
(45) Date of Patent: Jul. 20, 2004

(54) CONVEYOR SYSTEM

(76) Inventor: Christopher R. Brehm, 339 Sunset Dr., Defiance, OH (US) 43515

( * ) Notice: Subject to any disclaimer, the term of this patent is extended or adjusted under 35 U.S.C. 154(b) by 65 days.

(21) Appl. No.: 10/278,651

(22) Filed: Oct. 23, 2002

Related U.S. Application Data

(60) Provisional application No. 60/332,931, filed on Nov. 6, 2001.

(51) Int. Cl.$^7$ .............................................. B65G 43/00
(52) U.S. Cl. ................. 198/460.1; 198/461.1; 198/577
(58) Field of Search .................. 198/460.1, 461.1, 198/459.1, 575, 577, 792

(56) References Cited

U.S. PATENT DOCUMENTS

| | | | |
|---|---|---|---|
| 5,341,916 A | | 8/1994 | Doane et al. |
| 5,711,410 A | * | 1/1998 | Cai et al. ................. 198/460.1 |
| 5,738,202 A | * | 4/1998 | Ydoate et al. ........... 198/460.1 |
| 5,823,319 A | | 10/1998 | Resnick et al. |
| 5,979,636 A | * | 11/1999 | Vanacore et al. ........ 198/460.1 |
| 6,244,421 B1 | * | 6/2001 | Hall ........................ 198/460.1 |
| 6,253,906 B1 | * | 7/2001 | Hall ........................ 198/460.1 |
| 6,629,593 B2 | * | 10/2003 | Zeitler .................... 198/460.1 |

* cited by examiner

*Primary Examiner*—Douglas Hess
(74) *Attorney, Agent, or Firm*—Emch, Schaffer, Schaub & Porcello Co., L.P.A.

(57) ABSTRACT

This conveyor system provides head-to-head or head-to-tail placement of product. More specifically, the system is configured to use the minimum acceleration necessary to perform the targeted spacing. Feedback control continuously readjusts acceleration to perform the given work. The system uses one or more contiguous variable speed conveyors that work together to space items by a calculated amount at each output juncture attempting minimum acceleration necessary to perform the given work. During product transition, an acceleration match is made with downstream conveyor where additional spacing correction can occur. Feedback control is used to continually readjust acceleration as necessary to meet spacing requirements.

16 Claims, 4 Drawing Sheets

CONVEYOR SYSTEM

This application claims the benefit of provisional applicant Ser. No. 60/332,931 filed Nov. 6, 2001.

TECHNICAL FIELD

This invention relates to a conveyor system for providing head-to-head and/or head-to-tail placement of product. More specifically, my system is configured to use the minimum acceleration necessary to perform the placement of product in relation to each other. Feedback control continuously readjusts acceleration to perform the given work.

BACKGROUND OF THE INVENTION

Industry long has faced a problem of increased conveyor wear and tear at ever increasingly higher conveyor speeds in order to handle throughput requirements. Another problem is that it becomes increasingly more difficult accurately control items as conveyor speeds increase. One way to minimize the requirement of increasing conveyor speed is by keeping the air gap produced between items to the minimum that is required. This also has the added effect of providing higher throughput rates than could otherwise be achieved without changing the overall speed of the conveyor (if retrofitting an existing conveyor system for instance).

In targeting a gap industry has faced the problem of being able to open/close gap by any significant amount and handle the item in gentle fashion. Invention overcomes this problem and can provide gentler product handling than other prior art methods by its ability to split the work of opening/closing gap in a desired fashion over multiple conveyor sections working together. This approach can reduce the amount of expensive drives, electrical controls, and maintenance that may be required as compared with some other prior art methods reducing overall system cost. In targeting placement of product in relation to another, invention can be used with in-line scales, etc. by its ability to establish a head-to-head gap as well.

Prior art has taken various approaches to the above issues. One approach was simply to count on a speed ratio to ensure there is sufficient gap between items. Another approach was to use variable speed motor controllers or constant speed controllers to control the conveyors. A recent system uses a speed control on the upstream conveyor with three settings. The settings were nominal, higher than nominal and lower than nominal. Obviously, this method does not account for feeding a conveyor that has no nominal speed (one that can accelerate and decelerate) or to feed product at something other than the nominal speed (i.e. product may target a speed higher or lower than downstream conveyor is traveling). Additionally, flexibility is lost when the speed control limits are defined by the conveyor instead of the product that is on the conveyor. Unlike other prior art, my system targets the placement of product in relation to another as opposed to just spacing of product. Placement of product provides the added ability to target head-to-head gap as well as a head-to-tail gap.

SUMMARY OF THE INVENTION

My system uses one or more contiguous variable speed conveyors that work together to space items at a predefined gap at each output juncture using minimum acceleration necessary to perform the given work. Feedback control is used to continually readjust acceleration as necessary to meet spacing requirements.

The system is a conveyor system for providing targeted head-to-tail spacing and/or head-to-head spacing between product including a product of influence comprising:
a first device having a conveyor, a device entry point and a device exit point;
a free space having an end point downstream of the exit point of the first device;
a monitor for monitoring movement of the product of influence in the first device;
a computer responsive to the movement of the product of influence in the first device programmed to determine a start-of-synch point and an end-of-synch point;
a speed control responsive to the computer for controlling the velocity and/or acceleration of the conveyor of first/subsequent devices;
wherein the computer also is programmed to determine the acceleration needed for the product of influence to travel from the start-of-synch point to the end point of the free space;
wherein the computer also is programmed to set a synch velocity which is the velocity of the first device when the front of synch point reaches the first device exit point plus free space; and
wherein the speed control responsive to the computer continues the synch velocity until the end-of-synch point reaches the first device exit point.

A downstream conveyor can be variable in speed as long as the behavior of downstream conveyor can be anticipated. As item progresses across the first device at time interval x (where x is a constant), the minimum accel/decel is recalculated based on actual movement of the conveyor and estimated movement during each time interval x. This is the feedback control that increases or decreases acceleration of conveyor based on actual movement y and estimated movement during time interval x. Y is actual measured movement of the first device. Note that estimated movement is never incremented beyond the resolution of y. If y is 1 inch then estimated movement increments to 1 inch—but not beyond. The converse is also true, if actual movement y (1 inch in this example) is detected and estimated movement is 0.5 inches, actual movement is changed from 0.5 inches to 1 inch (y always takes precedence over estimated movement during time x).

The first device uses this information to calculate the acceleration required (every time interval x). It also calculates what its velocity and distance traveled should be at the next interval x. Minimum acceleration is being recalculated every time interval x. If the first device falls behind or gets ahead the calculated acceleration will increase or decrease. This is the feedback control.

Feedback control allows for more accurate product positioning than could otherwise be achieved. It also has the ability to use non-precise equipment and obtain acceptable results. An example of using non-precise equipment to obtain acceptable results is a VFD with limited number of accel/decel digital input commands. In this case the accel/decel command to the VFD that best fits the desired (calculated minimum) accel/decel.

DETAILED DESCRIPTION OF THE PREFERRED EMBODIMENT(S)

Figure 1:
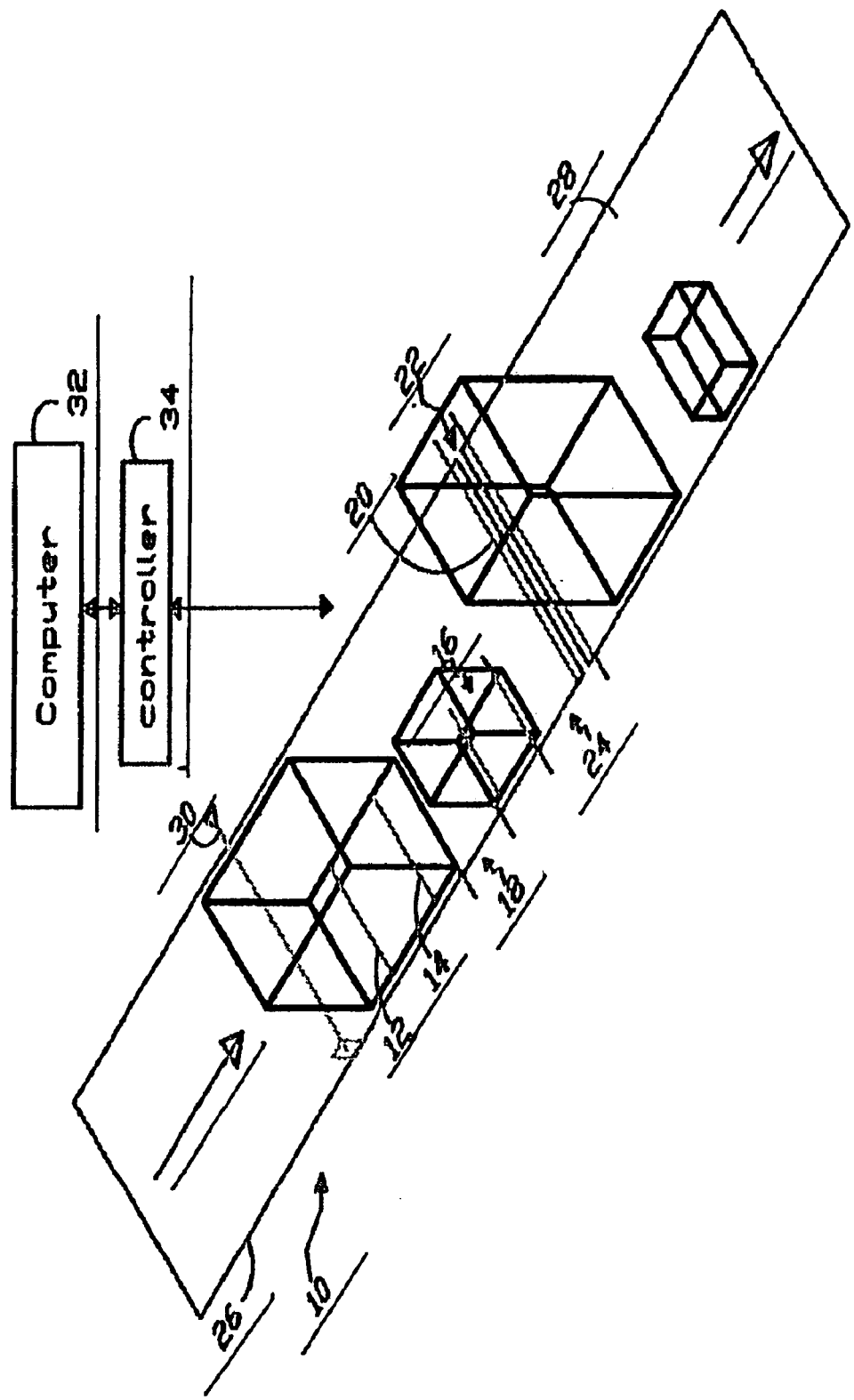
FIG. 1 is a plan view of a conveyor system according to this invention.

The first device is the conveying device which is upstream of any subsequent device. The subsequent device is a downstream device in a multi-device setup for conveying products.

An outfeed conveyor is the conveying surface immediately following the first device. This can be another device or some other conveying device.

Free space is the transitional gap that exist between the exit of the first device to the outfeed conveyor. This space is utilized in calculations to enhance the calculated working distance. By including free space in calculating the working distance, required acceleration/deceleration is further reduced.

Start-of-synch point is distance from front of product being conveyed +/- (downstream or upstream). Velocity match (velocity matches synchronize velocity) occurs when start-of-synch point has reach device exit point plus free space. Note that synchronize velocity can be different than the downstream conveying velocity. At velocity match point acceleration match is then achieved until end-of-synch point. Once start-of-synch has reached device exit point plus the free space the corresponding product becomes the first product on the subsequent device. Start-of-synch point is then shifted on subsequent device to represent where product is actually located on subsequent device. Location of product on subsequent device is affected by the average velocity difference between these two conveyors.

End-of-synch point is distance from end of product being conveyed +– (upstream or downstream). Device exit point is the point typically located at the centerline of the exit roller of the first device. This is the point where device can no longer influence product position. Product is considered to have exited (no longer product of influence) device when its' end-of-synch point has reached device exit point. End-of-synch point changes dynamically in relationship to product end when synchronize velocity (velocity to achieve when front of synch point reaches device exit point plus free space) does not match subsequent device velocity.

This invention uses one or more devices. Each device allows for control of its velocity and/or acceleration. Each device provides feedback as to the distance traveled by the conveying surface. If device does not have feedback as to distance traveled then distance traveled is equal to calculated estimated distance traveled. Measured distance traveled overrides estimated distance traveled in determining minimum acceleration. Device determines minimum acceleration required from current estimated location of front of synch point and takes into account new information (e.g. actual distance traveled of product, new product front of synch point actual measured position of product downstream, etc.). Because new information can be gathered about product, calculated acceleration required for product can vary as product progresses across device. Minimum acceleration is determined every time interval x (where x is a constant). New minimum acceleration is applied to device if possible. Synchronize velocity (i.e. velocity of device when front of synch point reaches device exit point plus free space) is set as a ratio of downstream velocity. Once synchronize velocity is achieved an acceleration match with subsequent device is maintained. This also allows device to be used as an enhanced metering belt that is able to both open and close up gap detected between product and attempt to exactly meet the spacing requirement. Device infeed eye detects products leading edge. Infeed eye is placed so that products leading edge is at point of acceptable control. This is the point of product inception and whose end-of-synch point has not reached device exit point. When an incepted product becomes the device of influence the minimum acceleration from its current estimated location is determined. Minimum acceleration is achieved when acceleration and deceleration are equal to each other for the entire duration that is possible for product to accelerate and decelerate. That is when the front of synch reaches device exit point plus free space. Typically this is calibrated to be the centerline of the first roller on downstream conveyor—first point that product makes contact with downstream device. Furthermore, when front of synch point reaches device exit point plus free space the synchronize velocity is calculated to synchronize with the downstream device. Velocity synchronization with that of the downstream conveying device continues until end-of-synch point passes device exit point. The device can feed a downstream conveyor whose speed is constantly varying (as long as behavior of downstream conveyor can be anticipated). Maximum acceleration depends on parameters at time device is set-up. Two modes of determining maximum acceleration are provided: 1) device uses a default maximum acceleration (applies to all products equally). 2) each incepted product is assigned a maximum acceleration based on product parameters. Device then looks at all incepted products and uses the maximum acceleration of smallest value. A subsequent device does not require an infeed eye. Product inception on a subsequent device occurs when front of synch point reaches devices exit point plus free space on the previous device. A subsequent device may have a product placement correction eye. If this eye is present then it detects product trail edge and is used to provide placement correction. Placement correction eye is located so that product trail-edge is at point of acceptable control. Typically this is located at the center line of the exit roller of previous device (i.e. previous device no longer can influence product position at this point). Updated actual position may alter the accel/decel required for product.

Synch velocity is the velocity product of influence is to synchronize to when its start-of-synch-point reaches exit point. Synch velocity is directly related to the velocity of the downstream conveyor (i.e. synch velocity may be different than downstream conveyor velocity).

The following parameters are independent of the product being conveyed:

Peak velocity is the peak velocity device is allowed to reach. Once device reaches peak velocity it levels off until decel is required to meet with synch velocity. Note that peak velocity of device can exceed peak velocity of downstream conveyor. Peak velocity is typically set to a value that is never expected to be reached.

Free space is the space at outfeed of first device to start of downstream conveyor where item does not touch a conveying surface. This is a constant that is used in determining the working distance. Free space does not affect end-of-synch point position. This constant affects all items equally.

No item accel is the acceleration allowed when no items are being conveyed on product.

Exit point is the most downstream point of first device where item first looses contact with conveying surface.

Head to tail gap is a final gap based on a table relating to product parameters to determine the head to tail gap (e.g. products target gap can be based on width detection equipment).

Head to head gap is a final gap based on desired head-to-head distance. If zero then disabled. Note that the final gap will not be set lower then the head to tail gap (e.g. the greater of the two is used as final gap).

The final gap speed ratio is normally 1:1. If product will transverse a speed ratio change downstream, this value can be set to compensate for this condition. Final gap is then recalculated applying final gap speed ratio so that the output after this speed ratio will be close to the desired gap.

The following parameters are dependent on item being conveyed:

Start-of-synch point is the distance from front of item +/− (downstream or upstream) that device is to synchronize its' acceleration with the downstream conveyor (i.e. start-of-synch point reaches exit point).

End-of-synch point is the distance from tail end of item +/− (downstream or upstream) where device no longer needs to synchronize its' acceleration with the downstream conveyor (i.e. end-of-synch point reaches exit point). End-of-synch point can change dynamically in relation to the end of carton based on desired synch velocity with relation to downstream conveyor.

Max item accel is the maximum acceleration/deceleration allowed for this item. Max item accel is loaded from a table based on carton length and/or height if height detect eyes are present. Working distance is the distance product can accel/decel before product acceleration is to synchronize with downstream conveyor.

Synchronize velocity is the velocity product is to achieve after front of synch point reaches device exit point plus free space. Synchronize velocity can be a ratio of downstream velocity. Once synchronize velocity is achieved product attempts to match acceleration of downstream conveying device.

Desired gap is the gap between items that we are attempting to achieve. Measured gap is actual gap measured between items. Gap to make up is difference between measured gap and desired gap. Final gap is the desired gap to achieve on the last device. Gap to make up can be positive or negative in value (i.e. open or close up gap).

FIG. 1 is a plan view of a conveyor system 10 according to this invention. FIG. 1 shows end of synch point 12 front of synch point 14 synch velocity 16 measured gap 18, exit point 20, free space 22 and open or close gap 24. FIG. 1 also shows first device 26 comprising one conveyor belt and downstream device 28 comprising one conveyor belt. Also shown is infeed eye/monitor system 30, computer 32 and speed controller 34.

Figure 2:
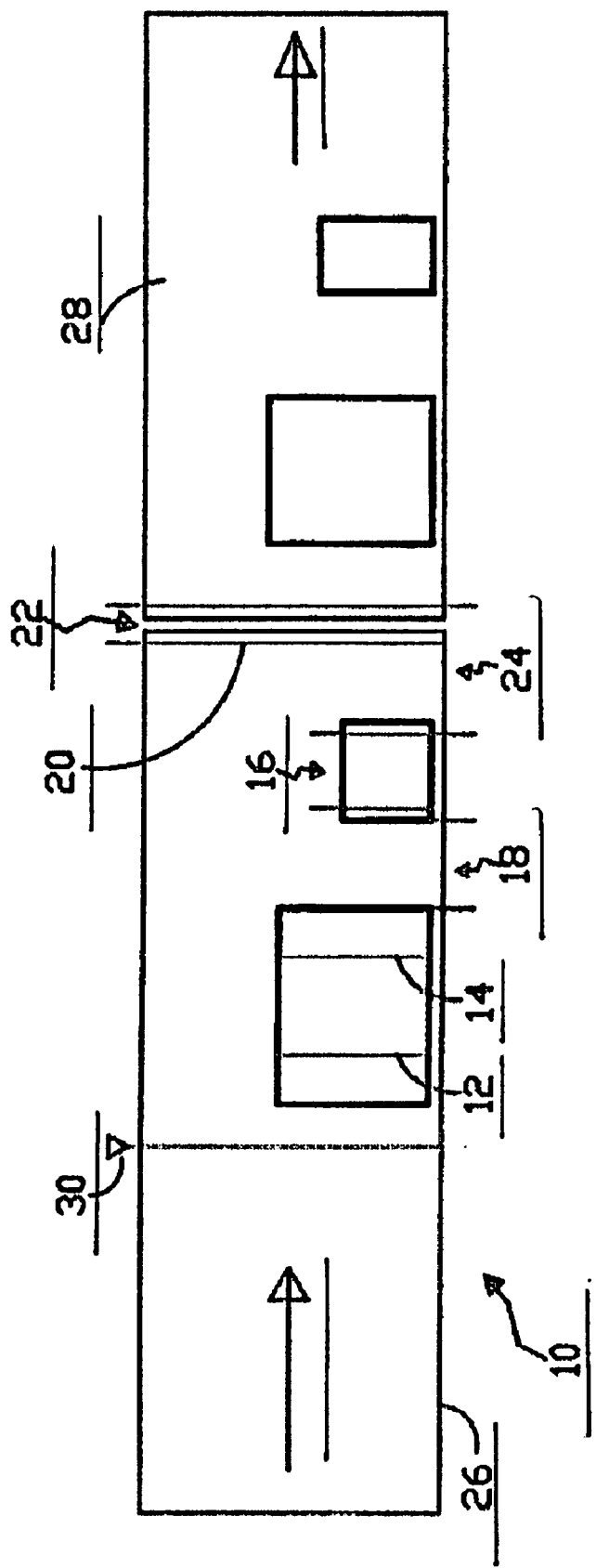
FIG. 2 is a plan view showing the synch points, exit point free space and working distance of this invention.

FIG. 2 is a top view showing the synch points, exit point, free space and working distance of this invention. FIG. 2 is top view showing the same parameters of FIG. 1.

Figure 3:
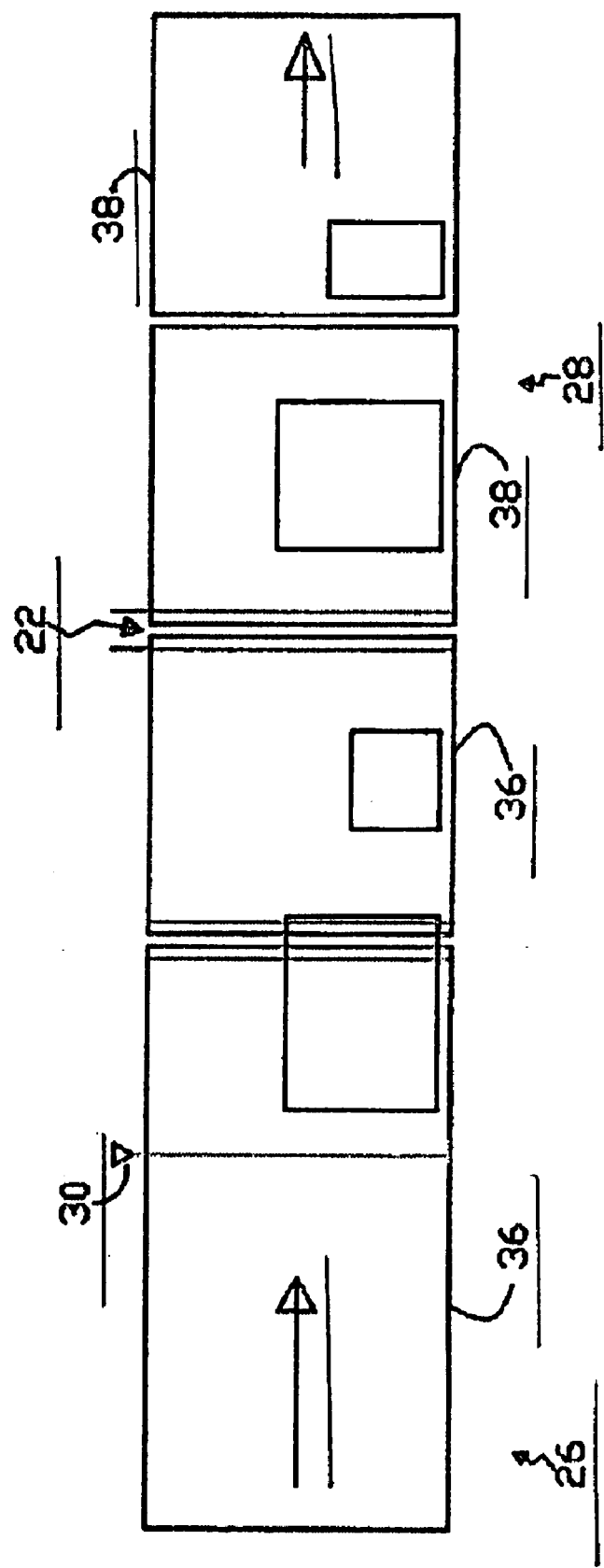
FIG. 3 is an example of system according to this invention using multiple shorter length belts.

FIG. 3 is an example of system according to this invention using multiple shorter length belts. FIGS. 1 and 2 show first 26 device comprising one conveyor belt. Free space 22 separates first conveyor belt 26 from the downstream device 28. In FIG. 3, first device 26 comprises multiple shorter length conveyor belts 36 prior to the free space 22 and the downstream device 28 comprising multiple belts 38.

Figure 4:
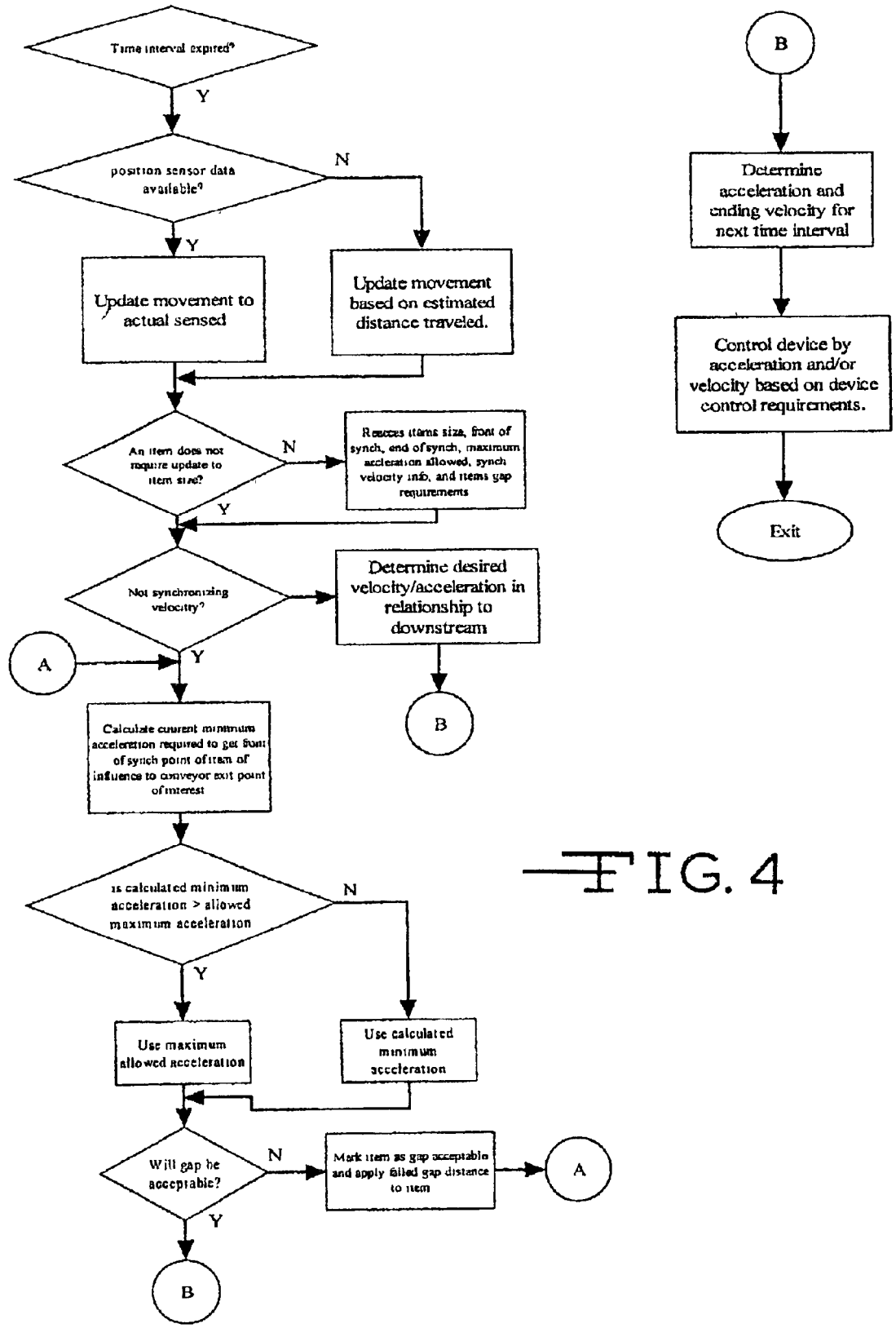
FIG. 4 is a logic flow diagram of the program used in this invention.

FIG. 4 is a logic flow diagram of the program used in this invention. This system calculates the current minimum acceleration required to get the front of synch point of the item of influence to the conveyor exit point of interest. The system also determines the desired velocity/acceleration in relationship to downstream requirements. It then determines the acceleration and ending velocity for the next time interval. It then controls the device by acceleration and/or velocity based on device control requirements.

Since the synch velocity may differ from downstream velocity, it is normal for the front-of-synch point of the product of influence to reach the exit point with desired gap or spacing not yet achieved. Because of this, the product of influence does not have to arrive at its discharge interface with its product of influence does not have to arrive at its discharge interface with its desired spacing achieved. Instead, the desired spacing is achieved during the acceleration match of the current device with the next downstream conveyor over the transition from the front-of-synch to end-of-synch points of the product of influence.

EXAMPLE 1

Once gap to make up is ascertained then it becomes necessary to determine how to split the work of final gap over the contiguous product exits. Ratio method is final gap split based on ratio. Example: assume two devices. If gap to make up is 6 inches and ratio method is enabled and set to 2:1 then the first product is responsible for 4 inches and the second 2 inches. If set to 1:1 then first and second product are to make up 3 inches. In a three product environment ratio might be set to 1:1:1, etc. Split method: same as setting ratio method 1:1. Normal mode: attempt to create desired spacing at each device output making synch velocity equal outfeed velocity when possible.

Desired spacing to make up can be positive or negative in value (i.e. open or close up product spacing). This is the spacing product of influence is targeting for this item on this device.

Desired spacing is measured spacing of product of influence on this device plus the desired spacing to make up.

In addition to these embodiments, persons skilled in the art can see that numerous modifications and changes may be made to the above invention without departing from the intended spirit and scope thereof.

What is claimed is:

1. Conveyor system for providing controlled spacing between product including a product of influence comprising:
   a first device having a conveyor, a device entry point and a device exit point;
   a free space having an end point downstream of the exit point of the first device;
   a monitor for monitoring movement of the product of influence in the first device;
   a computer responsive to the movement of the product of influence in the first device programmed to determine a start-of-synch point and an end-of-synch point;
   a speed control responsive to the computer for controlling the velocity and acceleration of the conveyor of the first device;
   wherein the computer also is programmed to determine the acceleration needed for the product of influence to travel from the start-of-synch point to the end point of the free space;
   wherein the computer also is programmed to set a synch velocity which is the velocity of the first device when the front of synch point reaches the first device exit point plus free space; and
   wherein the speed control responsive to the computer continues the synch velocity until the end-of-synch point reaches the first device exit point.

2. A system according to claim 1 wherein the monitor continuously monitors the actual distance the product of influence travels.

3. A system according to claim 1 wherein the acceleration the computer calculates is the minimum acceleration needed.

4. A system according to claim 1 including an outfeed conveyor downstream of the free space.

5. A system according to claim 4 wherein the computer also is configured to determine the velocity of the outfeed conveyor.

6. A system according to claim 1 wherein the product of influence is the most downstream product affecting the current behavior of the device.

7. A system according to claim 1 wherein the free space ends at an entry point of an outfeed conveyor.

8. A system according to claim 1 wherein the free space ends at an entry point of a subsequent device.

9. A system according to claim 1 wherein the monitor in the first device is an infeed eye.

10. A system according to claim 1 wherein the monitor is located between the entry point and exit point of the first device.

11. A conveyor system according to claim 1 wherein the computer is programmed to continually determine the acceleration required of the conveyor of the first device.

12. A conveyor system according to claim 1 wherein the computer is programmed to measure continually, distance actually traveled in the first device.

13. A conveyor system according to claim 12 wherein the computer also is programmed to determine acceleration from the distance actually traveled.

14. A conveyor system according to claim 13 wherein the computer also is programmed for measured distance traveled to override estimated distance traveled in determining minimum acceleration.

15. A process for providing controlled spacing between product including a product of influence comprising the steps of:

movingthe product including the product of influence through a first device having a conveyor, a device entry point and a device exit point;

subsequently moving the product through a free space having an end point downstream of the exit point of the first device;

monitoring the movement of the product of influence in the first device;

controlling the velocity and acceleration of the conveyor of the first device;

determining the minimum acceleration necessary to perform the controlled spacing based on the monitoring;

configuring a programmable, feedback control using the minimum acceleration; and using the feedback control to control the acceleration necessary to perform the controlled spacing.

16. A process according to claim 15 including the step of continuously readjusting the acceleration to perform the controlled spacing.

* * * * *